W. O. GILBERT.
SHOCK ABSORBER.
APPLICATION FILED JUNE 9, 1916.

1,254,674.

Patented Jan. 29, 1918.
4 SHEETS—SHEET 1.

Witnesses
Philip E. Barnes

Inventor
William O. Gilbert
By
Cashmere
Attys.

W. O. GILBERT.
SHOCK ABSORBER.
APPLICATION FILED JUNE 9, 1916.

1,254,674.

Patented Jan. 29, 1918.
4 SHEETS—SHEET 4.

Witnesses

Inventor
William O. Gilbert

UNITED STATES PATENT OFFICE.

WILLIAM O. GILBERT, OF OMAHA, NEBRASKA.

SHOCK-ABSORBER.

1,254,674.

Specification of Letters Patent.  Patented Jan. 29, 1918.

Application filed June 9, 1916. Serial No. 102,635.

*To all whom it may concern:*

Be it known that I, WILLIAM O. GILBERT, a citizen of the United States, residing at Omaha, in the county of Douglas and State of Nebraska, have invented new and useful Improvements in Shock-Absorbers, of which the following is a specification.

The present invention relates to shock absorbers which are now commonly used in connection with automobiles, and the purpose of which is to eliminate the sudden rebound (and resultant discomfort to passengers) of a flexed spring by retarding the action of the spring, so that its return, instead of being sudden, will be gradual and shock to the body of the vehicle and the occupants thereof will be prevented.

In the improvement which I have developed, and which will be hereinafter described, the construction is such that there is no interference with the flexing of the spring under its load, it being free to yield downwardly without any appreciable retardation, so that its full resiliency under the load is utilized, but the spring on its upward movement will be retarded; and the improvement is such that this retardation will be effective upon the slightest flexing and return of the spring, although the device, which I shall now describe in detail, having reference to the drawings which accompany and form a part of this disclosure, will be equally effective in retarding the return of the spring from the limit of its flexed position. In other words, the action of the shock absorber is only during that period when retardation is desirable, and is effective from the minimum degree of flexure of the spring to the maximum movement thereof.

Referring to the drawings by numerals, like numerals indicating like parts in the several views, 10 indicates a portion of a vehicle body, 11 a spring of the semi-elliptic type applied thereto, and 12 shows conventionally an axle.

Secured to one of the spring-connected parts (vehicle body or running gear) but preferably to a stationary part of the running gear, either the axle (as shown in the present case) or to any other convenient part, is a casing 13, of any suitable form, said casing being mounted on a saddle or other appropriately formed part 14 seated upon the axle, suitable securing means, as clips 15 or other appropriate devices, being provided to secure the saddle 14 fixedly to that part of the running gear on which it is mounted, the only necessity being that the casing 13 carried by the saddle 14, together with its contained retarding mechanism, be so mounted with respect to the spring 11 that the spring will be effectively retarded on its upward throw or movement after the same has been flexed.

Any convenient form of saddle or support may be used, but that herein disclosed is substantially T-shaped, the body portion resting on the axle to which it is secured by the clips 15, one at each end, the central leg of the T forming the point of attachment for the casing 18 and its associated parts.

Figure 2:
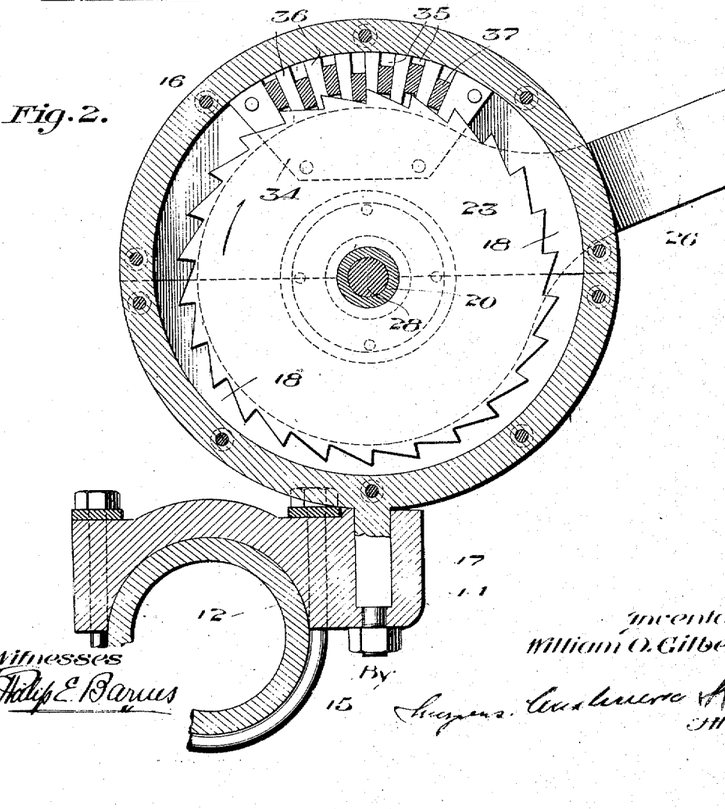
Fig. 2 is a vertical sectional view, on a larger scale than that of Fig. 1, of the shock absorber.

The said casing 18 comprises a central ring-like member 16, provided with a radially-projecting standard 17 which fits a suitable aperture or socket in the central leg of the bracket 14, as shown in Fig. 2, in which it may be secured in any suitable manner, as by a nut threaded to the end of the standard, as shown.

Figures 3, 4, 5, 6, 7:
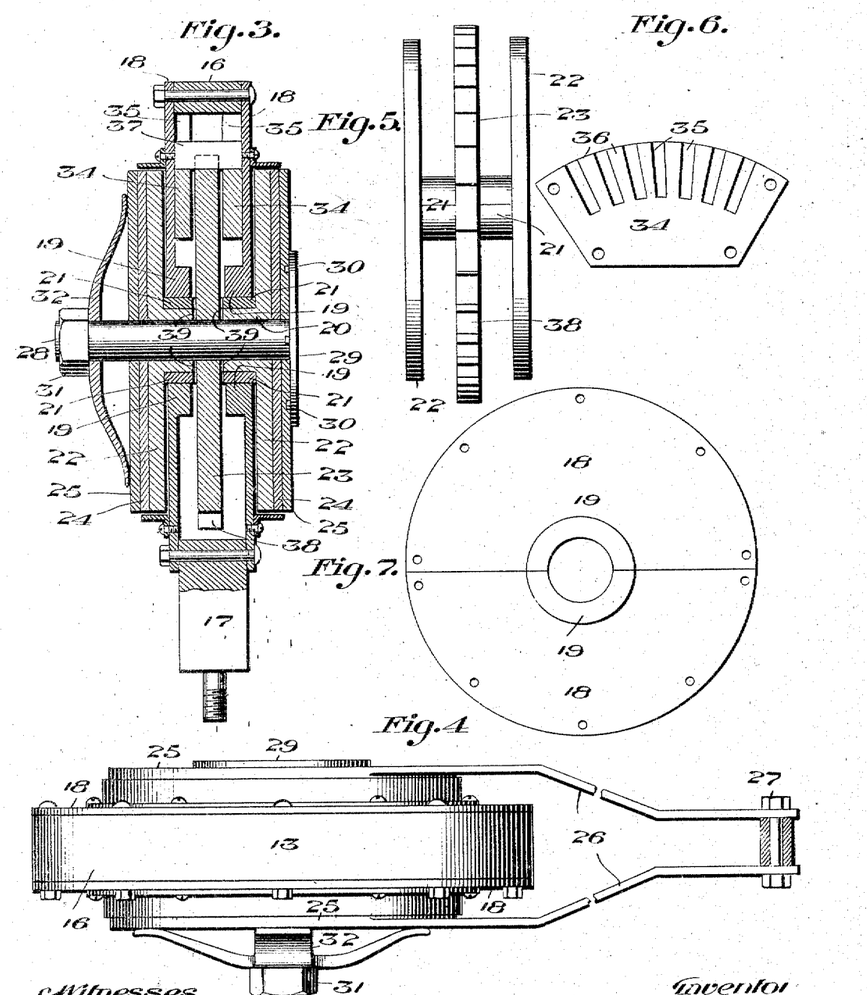
Fig. 3 is a vertical sectional view taken at right angles to the line of section of Fig. 2.
Fig. 4 is a plan view of the shock absorber shown in Fig. 1.
Fig. 5 is an edge view of a ratchet wheel and its associated parts.
Fig. 6 is an elevational view of one of the plates which form pawl seats for the pawls which are adapted to come into engagement with the ratchet wheel shown in Fig. 5.
Fig. 7 is a side elevation of the casing which houses the ratchet and pawl mechanism.

Secured to said ring-shaped frame 18 are plates 18 which inclose the ratchet and pawl mechanism, hereinafter described, each of said plates being formed as best shown in Fig. 7, in two parts, which together form a circular disk, but which are of unequal area, the line of division between the plates being a chord so as to give unequal segments, the upper one of which is the larger. The plates 18 have journal bearings preferably formed by thickening the plates at 19, to provide a bearing for a hollow shaft 20, and preferably suitable anti-friction bearing elements 21 will be interposed between the bearings 19 and the shaft 20 as shown in Fig. 3.

Formed integrally with said hollow shaft 20, as shown in Fig. 3, or separately therefrom and suitably secured thereto, as shown in Fig. 3, are disks 22, said disks lying outside of the side plates 18 heretofore described and forming one of the friction elements of the device.

The said shaft 20 has also, integral therewith or separate and suitably secured thereto, a centrally disposed ratchet wheel 23 which, together with the pawl mechanism presently to be described, is effective to initiate the retarding action of the absorber.

Against the outer faces of the disks 22 are friction disks 24 of any material suitable for giving a good frictional contact, and contiguous said friction disks are disks 25 having radially extending arms 26 which arms are tied together at their outer ends by any suitable means, as bolt 27.

The parts described are held together in the assembled condition set forth by a centrally disposed shaft 28 having at one end a bend 29 with projections 30 thereon which engage recesses in the disk 25 so as to insure the said shaft and disk rotating together. At its opposite end the shaft 28 is threaded and provided with a tensioning nut 31 which bears upon and tensions a spring 32 placed between it and the disk 25. By this means the friction between the assembled parts may be increased or decreased and adjustment for wear is provided for.

The radially projecting and connected arms 26 of the disk 25 are coupled by a link 33 to either the vehicle body or chassis so as to give a pivotal connection between the arms 26 of the shock absorber and the relatively movable vehicle.

The upper sections of the plates 18, heretofore referred to, are provided with plates 34 preferably of the truncated wedge form shown in Fig. 6, which plates 34 may be integrally formed with the plates 18, or suitably secured thereto, the said plates being of considerable thickness and provided with radiating slots 35 forming pawl seats, the said slots being separated from one another by partitions 36, the thickness of which partitions is preferably equal to the width of the pawl seats 35. The said plates 34 are placed opposite each other and form seats for a series of bars 37 which are free to move in and out in the slots 35, the said bars 37 forming pawls adapted to automatically engage the teeth 38 on the ratchet wheel 23, as best shown in Fig. 2. It will be observed that the inclination of the pawl seats 35 is such that the pawls 37 will, by gravity, tend to fall or slide downwardly, thus insuring a constant engagement of the pawls with the ratchet wheel 23.

It is obvious, of course, that the pawls 37 would be equally effective if arranged at any other position and provided with means, such as springs or other suitable means, to impel them forwardly and hold them against the ratcheted periphery of the friction member 23, but I prefer the arrangement herein disclosed, for the reason that springs are eliminated and the pawls 37 are controlled by gravity.

With this construction it will be obvious that when a rotating movement is given to the disks 25 by a downward movement of the vehicle body 10 and flexing of the spring 11, through the medium of the connecting link 33, the said disks 25, friction disks 24, disks 22, shaft 20, and ratchet wheel 23 will be revolved owing to the frictional engagement between the parts, since ratchet teeth 37 moving in the direction of the arrow in Fig. 2 trail idly beneath the pawls 38 which are lifted in their seats as the ratchet teeth rotate beneath them.

On the return or upward movement of the vehicle body 10 a movement of rotation in the opposite direction will be imparted through the connections just described, to the ratchet wheel and the assembled disks, but some one of the pawls 37 which is in contact always with the face of the ratchet wheel will engage a ratchet tooth 38, locking the ratchet wheel 23, hollow shaft 20 and disks 22 against rotation, and frictional resistance will be at once set up between the locked disks 22 and the disks 25 which will continue to rotate, the amount of friction depending, of course, on the area of the friction surfaces and the tension of the binding spring 32 mounted on the shaft 28, and this element of friction thus created will effectively retard the return of the body, preventing any sudden rebound, but compelling an easy and retarded upward movement of the body.

The casing 13 is preferably closed tight so as to provide a reservoir for lubricating oil, so that the various parts of the shock absorber may be maintained in a proper lubricated condition, oil ducts 39 being provided in the hollow shaft 20 so that the bearing surfaces between the shaft 20 and the shaft 28 is suitably oiled.

In order that the locking of the ratchet wheel and its associated friction disks which effects retardation of the return of the flexed spring may take place uniformly, it is desirable that the number of pawls and pawl partitions bear a certain ratio to the length of the ratchet tooth, and while the pawls and pawl partitions over the length of one tooth may be increased or diminished and be of odd or even number, the number of teeth over which the pawls operate may be varied, and the width of pawls and pawl partitions may be changed. I have in the present instance illustrated four teeth, positioned beneath the pawls and three and one half spaces over each tooth, the partitions 36 and the pawl seats 35 being referred to, alike as spaces.

With the arrangement here shown, the pawl seats and the pawl partitions are of the same or uniform width, and the relation which they bear to the length of the ratchet tooth is as three and one half to one, namely, there are three and one half spaces, that is pawls and pawl partitions, to each ratchet tooth, and in this embodiment the pawls and pawl spaces, which total fourteen in number, extend over four tooth lengths. With this arrangement it will be seen that one of the ratchet teeth will engage one of the pawls upon a movement of the ratchet wheel equal to one half of a space, that is one half the width of the pawl or pawl partition. Thus upon the slightest flexing and return of the vehicle spring one ratchet tooth will engage one of the pawls, and the retardation of the spring will be immediately effected.

Of course the arrangement of teeth and pawls may be varied as desired, and the amount of movement of the teeth before any one of them engages one of the ratchets to effect retardation of the spring depends on the number of teeth, the number of spaces covering the length of one tooth, and the width of the spaces.

Figure 8:
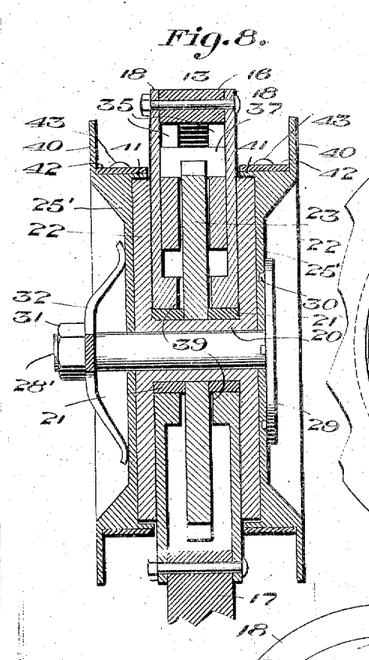
Fig. 8 is a transverse vertical sectional view of another form of shock absorber showing a modified construction.
Figure 9:
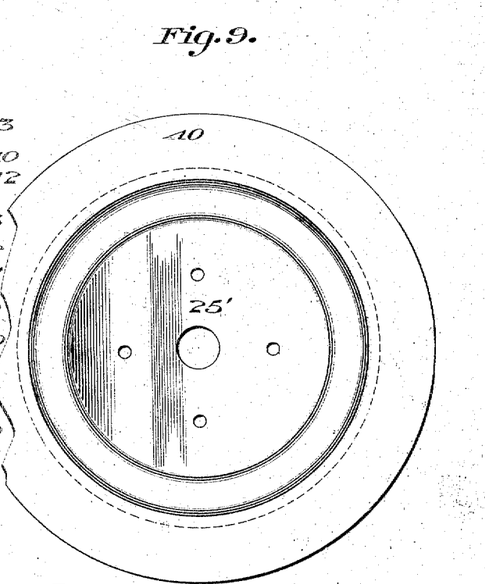
Fig. 9 is an outside elevational view of one of the frictional elements or disks disclosed in Fig. 8.
Figure 10:
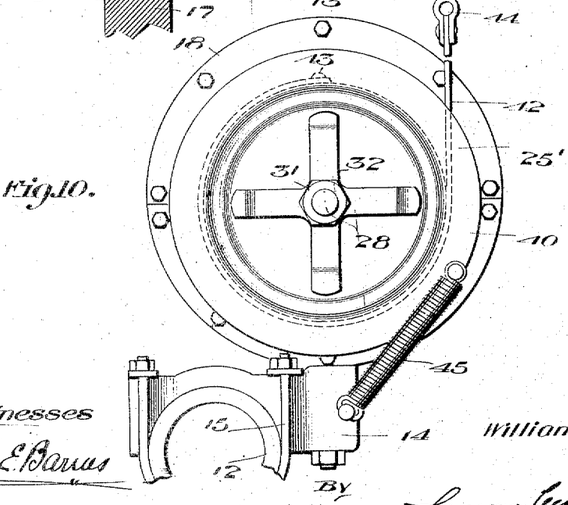
Fig. 10 is a side elevational view of the shock absorber shown in Fig. 8, illustrating the same applied to the vehicle.

Referring now to the embodiment of my invention disclosed in Figs. 8 to 10, the structure is similar to that illustrated in the preceding figures, except that the construction of the disks 25 has been modified and the connecting means between the shock absorber and the vehicle body has been changed, the casing 13 together with the pawl mechanism which it houses, the ratchet wheel 23, and the disks 22 carried by the shaft 20 being the same. In this embodiment the disks 25' are somewhat thicker adjacent their peripheries than their remaining portions, to form relatively wide peripheries, outwardly from which extend spherical retaining flanges 40. It is, of course, obvious that disks similar to those designated by the numeral 24, Fig. 3, may be interposed between the disks 22 and 25'. The disks 25' are provided with annular flanges 41 which are adapted to encircle the disks 22 and serve as dust guards therefor.

Encircled about each of the disks 25' is a strap 42 of leather or other suitable material which at its one end is firmly attached to the disk as at 43, and at its other end to the axle or body of the car, depending on whether the shock absorber is attached to the body or axle, in the present case the end of the strap being illustrated as connected to the body of the vehicle as at 44. A light spring 45 is attached at one end to the bracket 14 and at the other end to the periphery of one of the disks 25', so that upon a downward movement of the car body the disks will be revolved by the spring to rewrap the straps 42 about the disks, keeping the straps at all times taut and ready to operate upon the slightest return or upward movement of the vehicle body.

Upon the downward movement of the vehicle body the flexing of the springs is in no way interfered with, and the spring 45 will revolve the disks 25', disks 24, disks 22, the hollow shaft 20, and the ratchet wheel 23, the teeth of the latter being adapted to ride freely beneath the pawls 37. The upward or return movement of the vehicle body, however, is retarded, for the straps 42, having been tightly wrapped about the disks 25' by means of the spring 45, immediately tend to revolve the assembled mechanism in a reverse direction, but one of the ratchet teeth is immediately brought into engagement with one of the pawls, so that the ratchet wheel 23 together with the disk 22 are prevented from rotating, and the friction between the then stationary disks 24 and the rotating disks 25' is sufficient to prevent a quick upward movement of the vehicle body.

Figures 11, 12, 13:
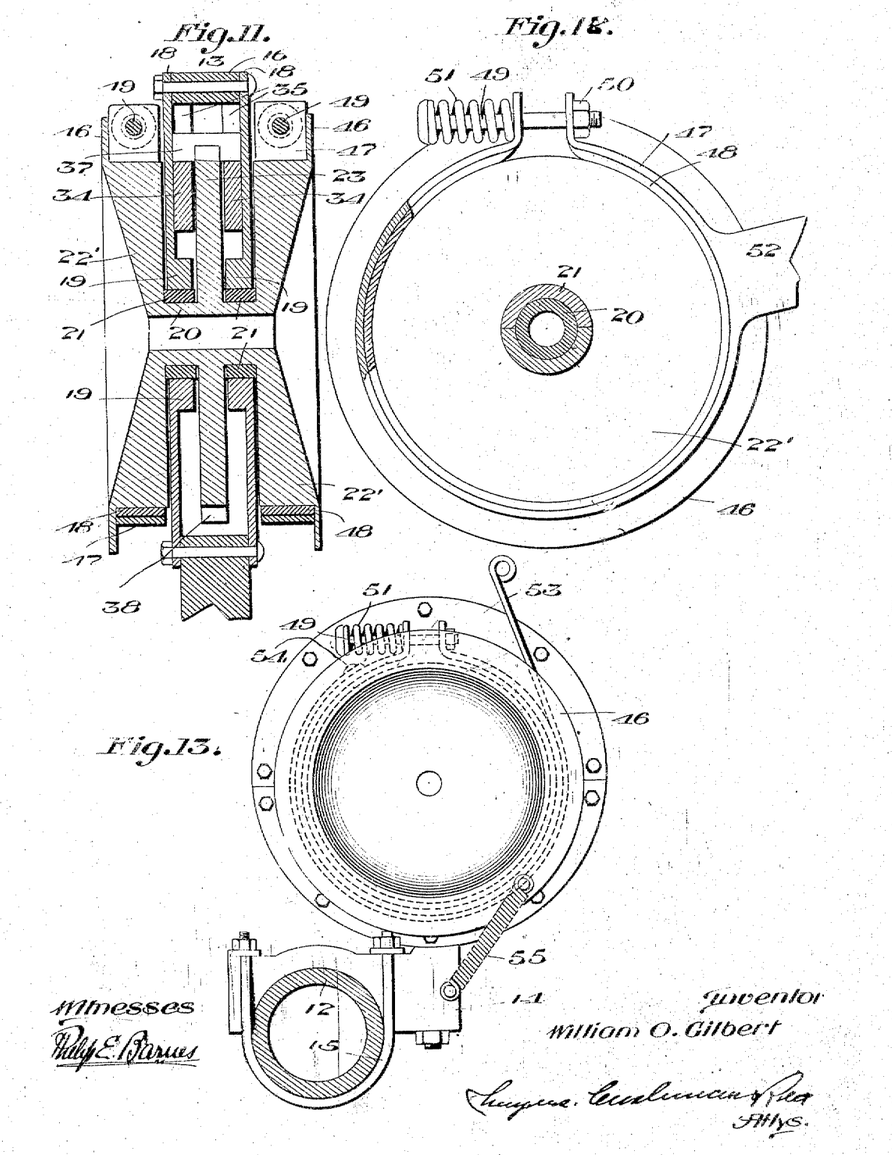
Fig. 11 is a view similar to Fig. 8, but showing another embodiment of my invention.
Fig. 12 is an inside elevational view of one of the frictional disks shown in Fig. 11 having a brake band about its periphery.
Fig. 13 is a view similar to Fig. 12 showing a slightly different construction, and showing the shock absorber applied to the axle of the vehicle.

Referring now to the embodiments disclosed in Figs. 11, 12 and 13, I have shown a casing 13 together with its internal ratchet wheel and pawl mechanism of the construction as that above described, but the disks 25, disks 24, together with the shaft 28 and spring 32, are omitted. Each of the disks 22', fixedly mounted upon the hollow shaft 20, is relatively broad at its circumference, thereby providing a periphery of sufficient width to receive an ordinary brake band retained upon the periphery of the disk by means of a peripheral retaining flange 46 extending outwardly from the outer edge of the disk. The brake band, in the present instance, comprises a metallic band 47 lined with a strip 48 of leather or other suitable friction material, but of course, it may be of any approved construction. The opposite ends of the metallic band 47 are tied together by means of a bolt 49 having a nut 50 threaded upon one of its ends. A tensioning spring 51 is coiled about one end of the bolt and engages at one end against the head of the bolt, and at the other against the metallic band, and this tensioning spring is adjusted to resiliently hold the brake band in close contact with the periphery of the disk 22'. The tension of the spring 51 may be varied by means of the nut 50.

Figure 1:
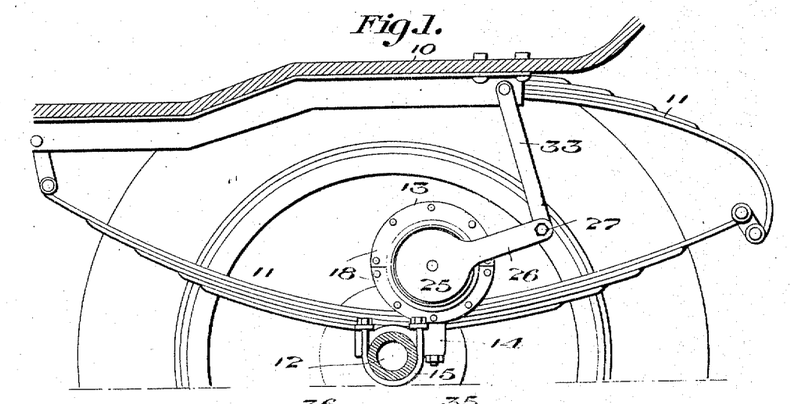
Figure 1 shows one embodiment of my improved shock absorber in elevation together with so much of a vehicle body and a spring of a not unusual type as will serve to illustrate the application of my invention.

In Fig. 12 I have shown the metallic portions 47 of the brake bands as having arms 52 which may be integral with the brake bands or connected thereto in any suitable manner, and these arms at their outer ends are connected to the body of the vehicle by a link 33 in the same manner as that disclosed in Fig. 1 of the drawings.

With the arrangement disclosed in Figs. 11 and 12, upon downward movement of the vehicle body the arms 52 are moved downwardly, and the brake bands together with the disks 22' and the ratchet wheel 23 are adapted to rotate in the direction of the arrow, Fig. 1, the pawls 37 riding up the inclined portions of the teeth 38, and the wheel 23 being adapted to freely rotate beneath the pawls. Upon the return or upward movement of the vehicle body, however, since the brake bands tightly grip about the peripheries of the disks 22', due to the tensioning spring 51, there is a tendency for the brake bands to cause the disks 22' to revolve in the reverse direction, but the disks are held stationary due to the engagement of the ratchet teeth 38 with the pawls 37, so that the bands slip about the peripheries of the disks, but there is sufficient friction therebetween to retard the upward movement of the vehicle body.

In Fig. 13 I have shown the brake band as connected to the body portion of the vehicle by means of a strap 53 of any suitable material which encircles the brake band and is connected thereto as at 54. A coil spring 55 is connected at one end to one of the disks 22', and at its other end to the bracket 14, and this spring serves the same purpose as spring 45 disclosed in Fig. 10.

With the structure shown in Fig. 13, upon downward movement of the vehicle body tension upon the straps 53 is relieved, and the spring 55 revolves the disks 22' together with the brake bands and the ratchet wheel 23 to rewrap the straps upon disks 22'; but immediately upon return movement of the vehicle body, the straps 53 having been snugly wrapped about the disks 22', and the ratchet teeth 38 having been brought into engagement with the pawls 37 to prevent rotation of the ratchet wheel together with the disks 22' in the opposite direction, the bands slip about the disks 22', and the friction between the bands and the disks 22' retards the upward movement of the vehicle body, and the body moves into normal position with an easy and relatively slow movement.

I claim:—

1. In a shock-absorber for spring supported vehicles, the combination with a relatively fixed support and bearings thereon, of a retarding member mounted in said bearings and rotatable in one direction, a second retarding member in frictional engagement with said first named member and rotatable in both directions, means to impart a movement of rotation to said members on movement of the vehicle body and flexure of the springs, a series of ratchet teeth on said first member, and a series of pawls slidably mounted in said support, any one of which may engage said ratcheted member.

2. In a shock-absorber for spring supported vehicles, the combination with a fixed casing, a shaft mounted thereon, a pair of disks mounted on said shaft and rotatable therewith in both directions, a retarding member freely mounted on said shaft and in engagement with said disks and rotatable therewith in one direction, means to impart a movement of rotation to said shaft, disks and member on movement of the vehicle body and flexure of the springs, a series of ratchet teeth on said retarding member, and a series of pawls slidably mounted in said casing, any one of which may engage said ratcheted member.

3. In a shock-absorber for spring supported vehicles, the combination with a relatively fixed casing, of a shaft rotatably mounted therein, a pair of disks mounted on said shaft and rotatable therewith in both directions, a retarding member between and in frictional engagement with said disks and rotatable therewith in one direction, means for adjusting said disks relative to said retarding member to vary the friction therebetween, means to impart a movement of rotation to said shaft, disks and retarding member on movement of the vehicle body and flexure of the springs, a series of ratchet teeth on said retarding member, and a series of pawls slidably mounted in said casing, any one of which may engage said ratcheted member.

4. In a shock-absorber for spring supported vehicles, the combination with a relatively fixed casing, of a shaft mounted therein, a pair of disks mounted on said shaft and rotatable therewith in both directions, a retarding member between and in frictional engagement with said disks and rotatable therewith in one direction, means for adjusting the disks relative to said retarding member to vary the friction therebetween, means to impart a movement of rotation to said shaft, disks and retarding member on movement of the vehicle body and flexure of the springs, a series of ratchet teeth on said retarding member, guideways or seats in the walls of said casing, a series of pawls slidably mounted in said guideways and adapted to act by gravity therein, any one of said pawls being adapted to engage the teeth of said ratcheted member.

5. In a shock-absorber for spring supported vehicles, the combination with a casing, of a retarding member rotatable in both directions, a second retarding member in frictional engagement with said first named member and rotatable therewith in one direction, a series of ratchet teeth on said second retarding member, means to impart a movement of rotation to said members on movement of the vehicle body and flexure of the springs, a plurality of guideways or seats above said second member and converging toward the center of rotation of said shaft, and a series of gravity pawls slidably mounted in said guideways, any one of said pawls being adapted to engage said ratcheted member.

6. In a shock absorber for spring supported vehicles, the combination with a casing, of a retarding member having a wheel within said casing and a retarding element on the outside of the casing and rotatable with said wheel, a second retarding member in frictional engagement with the retarding element of the first retarding member and rotatable in both directions, means to impart a movement of rotation to said retarding members on movement of the vehicle body and flexure of the springs, and means within the casing for engaging said wheel to prevent rotation of the first retarding member upon return movement of the vehicle body.

7. In a shock absorber for spring supported vehicles, the combination with a casing, of a shaft, a ratchet wheel within the casing fixedly mounted upon said shaft, a friction disk without the casing and also fixed to said shaft, a retarding member in frictional engagement with said disk and rotatable in both directions, means to impart a movement of rotation to said retarding member and disk on movement of the vehicle body and flexure of the spring, and means within the casing for engaging said ratchet wheel to prevent rotation of said wheel, and disk on return movement of the vehicle body.

8. In a shock absorber for spring supported vehicles, the combination with a casing, of a retarding member having a rotating retarding member without and on each side of said casing, retarding members in frictional engagement with each of said retarding elements of said first retarding member, means to impart a movement of rotation to all of said retarding members on movement of the vehicle body and flexure of the springs, and means within the casing to prevent rotation of said first retarding member upon return movement of the vehicle body.

9. In a shock absorber for spring supported vehicles, the combination with a casing, of a retarding member having a rotating retarding element without and on each side of said casing, retarding members in frictional engagement with each of said retarding elements of said first retarding member, means for varying the friction between said retarding members and elements, means to impart a movement of rotation to all of said retarding members on movement of the vehicle body and flexure of the spring, and means within the casing to prevent rotation of said first retarding member upon return movement of the vehicle body.

10. In a shock absorber for spring supported vehicles, the combination with a casing, of a retarding member having a pair of disks upon the outside of said casing and a ratcheted element within said casing, a retarding member in frictional engagement with each of said disks and rotatable in both directions, means to impart a movement of rotation to all of said retarding members on movement of the vehicle body and flexure of the spring, means for engaging said ratcheted element to prevent rotation of the first retarding member, and means for varying the frictional engagement between said retarding members.

11. In a shock absorber for spring supported vehicles, the combination with a casing, of a retarding member having a pair of disks upon the outside of said casing and a ratchet wheel within said casing, a retarding member in frictional engagement with each of said disks and rotatable in both directions, means to impart a movement of rotation to all of said retarding members on movement of the vehicle body and flexure of the spring, and a gravity pawl to engage said ratchet wheel and prevent rotation thereof on return movement of the vehicle body.

12. In a shock absorber for spring supported vehicles, the combination with a casing, of a shaft, a ratchet wheel within the casing fixedly mounted upon said shaft, a friction disk without the casing and also fixed to said shaft, a retarding member in frictional engagement with said disk and rotatable in both directions, means to impart a movement of rotation to said retarding member and disk on movement of the vehicle body and flexure of the spring, and a series of pawls slidably mounted in said casing, any one of which may engage said ratchet wheel.

13. In a shock absorber for spring supported vehicles, the combination with a casing, of a shaft, a wheel fixed upon said shaft within said casing, a disk mounted upon each of the ends of said shaft without said casing, a retarding member in engagement with each of said disks and rotatable in both directions, a series of ratchet teeth on said wheel, means to impart a movement of rotation to said disks and retarding members on movement of the vehicle body and flexure of the spring, and a plurality of engaging means any one of which may engage said ratchet wheel to prevent rotation of said disks on return movement of the vehicle body.

14. In a shock absorber for spring supported vehicles, the combination with a casing, of a shaft mounted in said casing, a ratchet wheel mounted within said casing upon said shaft, a disk on either side of said casing fixedly mounted upon said shaft, a frictional disk in engagement with each of said first frictional disks, means to impart a movement of rotation to all of said disks on movement of the vehicle body and flexure of the spring, and means for engaging said ratchet wheel to prevent rotation of the first mentioned disks on the return movement of the vehicle body.

15. In a shock absorber for spring supported vehicles, the combination with a casing, of a shaft mounted in said casing, a ratchet wheel mounted within said casing upon said shaft, a disk on either side of said casing fixedly mounted upon said shaft, a frictional disk in engagement with each of said first frictional disks, means to impart a movement of rotation to all of said disks on movement of the vehicle body and flexure of the spring, and a plurality of pawls any one of which may engage and prevent rotation of said ratchet wheel on return movement of the vehicle body.

16. In a shock absorber for spring supported vehicles, the combination with a casing, of a shaft mounted in said casing, a ratchet wheel mounted within said casing upon said shaft, a disk on either side of said casing fixedly mounted upon said shaft, a frictional disk in engagement with each of said first frictional disks, means to impart a movement of rotation to all of the disks on movement of the vehicle body and flexure of the spring, means for engaging said ratchet wheel to prevent rotation of the first mentioned disks on the return movement of the vehicle body, and means for varying the frictional engagement between said disks.

17. In a shock absorber for spring supported vehicles, the combination with a casing, of a hollow shaft mounted in bearings therein, a ratchet wheel within the casing fixed upon said shaft, a disk mounted on either side of said casing and fixed to said shaft, a disk in engagement with each of said first disks, means for retaining said second disks in engagement with said first disks, means connected to said second disks for imparting a movement of rotation to all of said disks on movement of the vehicle body and flexure of the springs, and means for preventing rotation of said ratchet wheel on return movement of the vehicle body.

18. In a shock absorber for spring supported vehicles, the combination with a casing, of a hollow shaft mounted in bearings in said casing, a ratchet wheel fixed upon said hollow shaft, a disk fixed on said hollow shaft on either side of said casing, a disk in engagement with each of said first mentioned disks, a second shaft extending through said hollow shaft and having means for connecting said last mentioned disks to said second shaft so as to rotate therewith, means for imparting a movement of rotation to all of said disks on movement of the vehicle body and flexure of the springs, and means within the casing for preventing rotation of said ratchet wheel on return movement of the vehicle body.

19. In a shock absorber for spring supported vehicles, the combination with a casing, of a hollow shaft mounted in bearings in said casing, a ratchet wheel fixed upon said hollow shaft, a disk fixed on said hollow shaft on either side of said casing, a disk in engagement with each of said first mentioned disks, a second shaft extending through said hollow shaft and having means for connecting said second disks to said second shaft so as to rotate therewith, means upon one end of said shaft for resiliently maintaining said disks in frictional engagement, means for imparting a movement of rotation to all of said disks on movement of the vehicle body and flexure of the springs, and means within the casing for preventing rotation of said ratchet wheel on return movement of the vehicle body.

20. In a shock absorber for spring supported vehicles, the combination with a casing, of a hollow shaft mounted in bearings in said casing, a ratchet wheel fixed upon said hollow shaft, a disk fixed on said hollow shaft on either side of said casing, a frictional disk in engagement with each of said first mentioned disks, a second shaft extending through said hollow shaft and having means for connecting said second frictional disks to said second shaft so as to rotate therewith, a spring upon one end of said second shaft for resiliently maintaining said disks in frictional engagement, means upon the second shaft engaging said spring for adjusting the tension thereof, means for imparting a movement of rotation to all of said disks on movement of the vehicle body and flexure of the spring, and means within the casing for preventing rotation of said ratchet wheel on return movement of the vehicle body.

21. In a shock absorber for spring supported vehicles, the combination with a casing, of a shaft mounted within the casing, a ratchet wheel fixedly mounted upon the shaft within said casing, frictional elements fixedly mounted upon said shaft on either side of said casing, retarding members in frictional engagement with the outer faces of each of said retarding elements, means for imparting a movement of rotation to said frictional elements and retarding members on movement of the vehicle body and flexure of the springs, and means to engage said ratchet wheel and prevent rotation of said frictional elements on return movement of the vehicle body.

In testimony whereof I have hereunto set my hand.

WILLIAM O. GILBERT.